US011745094B2

(12) United States Patent
Wang et al.

(10) Patent No.: US 11,745,094 B2
(45) Date of Patent: Sep. 5, 2023

(54) CONTROLLER SYSTEM WITH MODULE MOUNTABLE ON BASE

(71) Applicant: Microsoft Technology Licensing, LLC, Redmond, WA (US)

(72) Inventors: Shuoqi Scott Wang, Redmond, WA (US); James McColl Shields, Seattle, WA (US); Ryan Eugene Whitaker, Seattle, WA (US); Tero Juhani Patana, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/352,824

(22) Filed: Jun. 21, 2021

(65) Prior Publication Data

US 2022/0401826 A1  Dec. 22, 2022

(51) Int. Cl.
*A63F 13/2145* (2014.01)
*A63F 13/24* (2014.01)
*G06F 3/041* (2006.01)
*G06F 3/044* (2006.01)

(52) U.S. Cl.
CPC .......... *A63F 13/2145* (2014.09); *A63F 13/24* (2014.09); *G06F 3/044* (2013.01); *G06F 3/0416* (2013.01)

(58) Field of Classification Search
CPC ...... A63F 13/2145; A63F 13/24; A63F 13/22; A63F 13/23; G06F 3/0416; G06F 3/044
See application file for complete search history.

(56) References Cited

U.S. PATENT DOCUMENTS

| 8,430,753 B2 | 4/2013 | Ikeda et al. |
| 2004/0023719 A1* | 2/2004 | Hussaini ................. A63F 13/92 463/37 |
| 2021/0178255 A1* | 6/2021 | Basara .................. A63F 13/837 |

OTHER PUBLICATIONS

"Nintendo 64 accessories", Retrieved From: https://en.wikipedia.org/w/index.php?title=Nintendo_64_accessories&oldid=1027471913, Retrieved on: Jun. 8, 2021, pp. 1-20.
"International Search Report and Written Opinion Issued in PCT Application No. PCT /US2022/029936", dated Sep. 12, 2022, 11 Pages.

* cited by examiner

*Primary Examiner* — Yaron Cohen
(74) *Attorney, Agent, or Firm* — Alleman Hall Creasman & Tuttle LLP

(57) ABSTRACT

A controller system is provided herein that includes a controller base including at least one input device for receiving user input and a mechanical interface. The controller system further includes a controller module comprising a processor and memory. The controller module is configured to removably mount on the controller base at the mechanical interface thereby establishing a communication link therebetween. The user input received at the at least one input device is routed through the controller module to a console computing device.

20 Claims, 9 Drawing Sheets

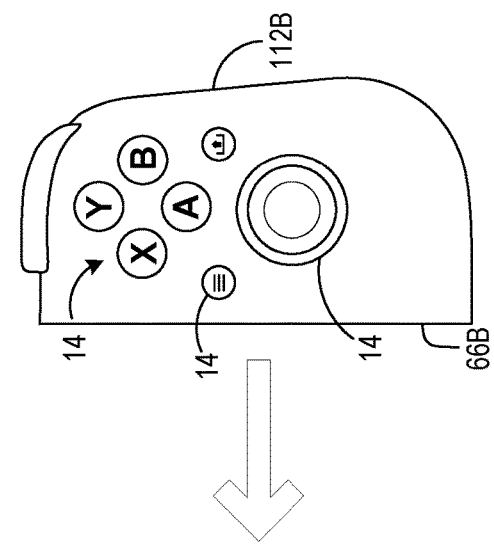
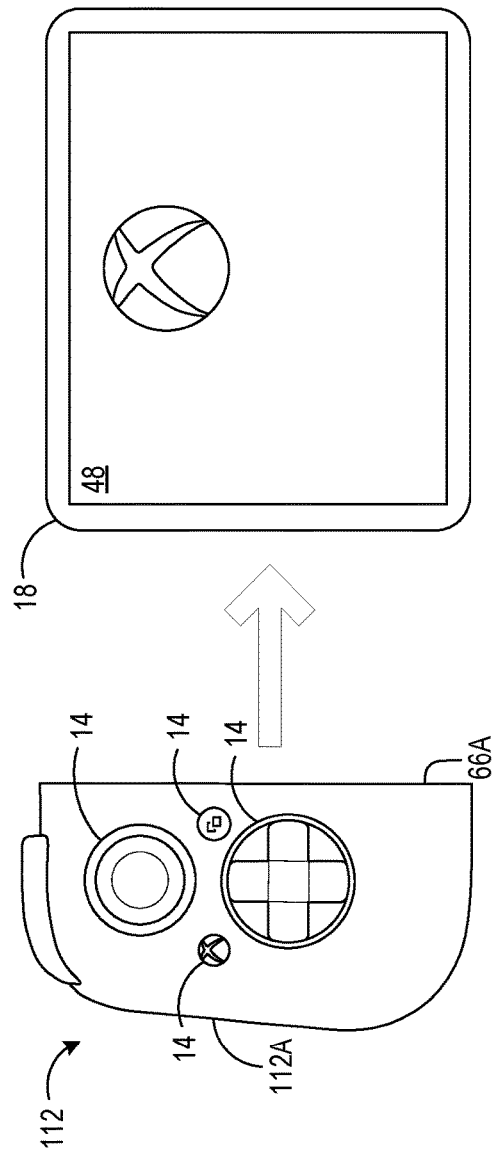
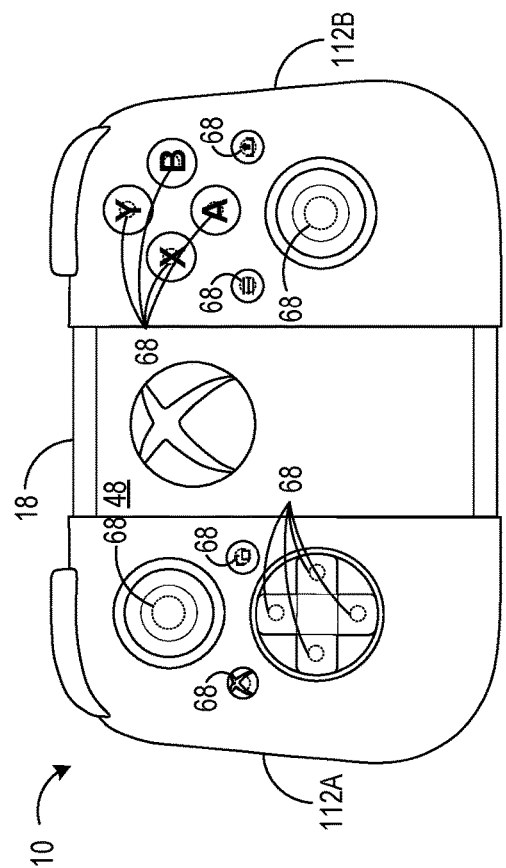
FIG. 6A
FIG. 6B

CONTROLLER SYSTEM WITH MODULE MOUNTABLE ON BASE

BACKGROUND

Console computing devices provide a gaming platform usable by various types of controllers held by users. Wired controllers connect to the console computing device via a specific connector and wireless controllers typically take time to pair, reconfigured to the user's preferred settings, and perhaps download a firmware update. Each console computing device typically connects only to specific controllers, and therefore gamers with multiple console computing devices often find themselves juggling many different controllers needing to be charged and managed. However, a multi-console user is typically only using one controller and console computing device at any given moment, while the remaining controllers largely sit unused.

Even for a given console computing device, different versions of connectable controllers are often available to the user. For example, a base version that is sold together with the console computing device, an elite or luxury version with additional features, an adaptive version designed to make the console computing device more accessible for users with disabilities, and so on. These versions may not all be initially available and the user may end up switching or upgrading over time, and therefore repeating the process of pairing, reconfiguring, etc. with each new controller. Furthermore, newer controllers may have newer features and firmware, and switching between new and old controllers for a single console computing device may frustrate the user who is not receiving a uniform experience.

SUMMARY

A controller system disclosed herein may include a controller base including at least one input device for receiving user input and a mechanical interface. The controller system may include a controller module comprising a processor and memory. The controller module may be configured to removably mount on the controller base at the mechanical interface thereby establishing a communication link therebetween. The user input received at the at least one input device may be routed through the controller module to a console computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6A shows an unassembled state of another implementation of the controller system of FIG. 1, and FIG. 6B shows an assembled state.

DETAILED DESCRIPTION

Figure 1:
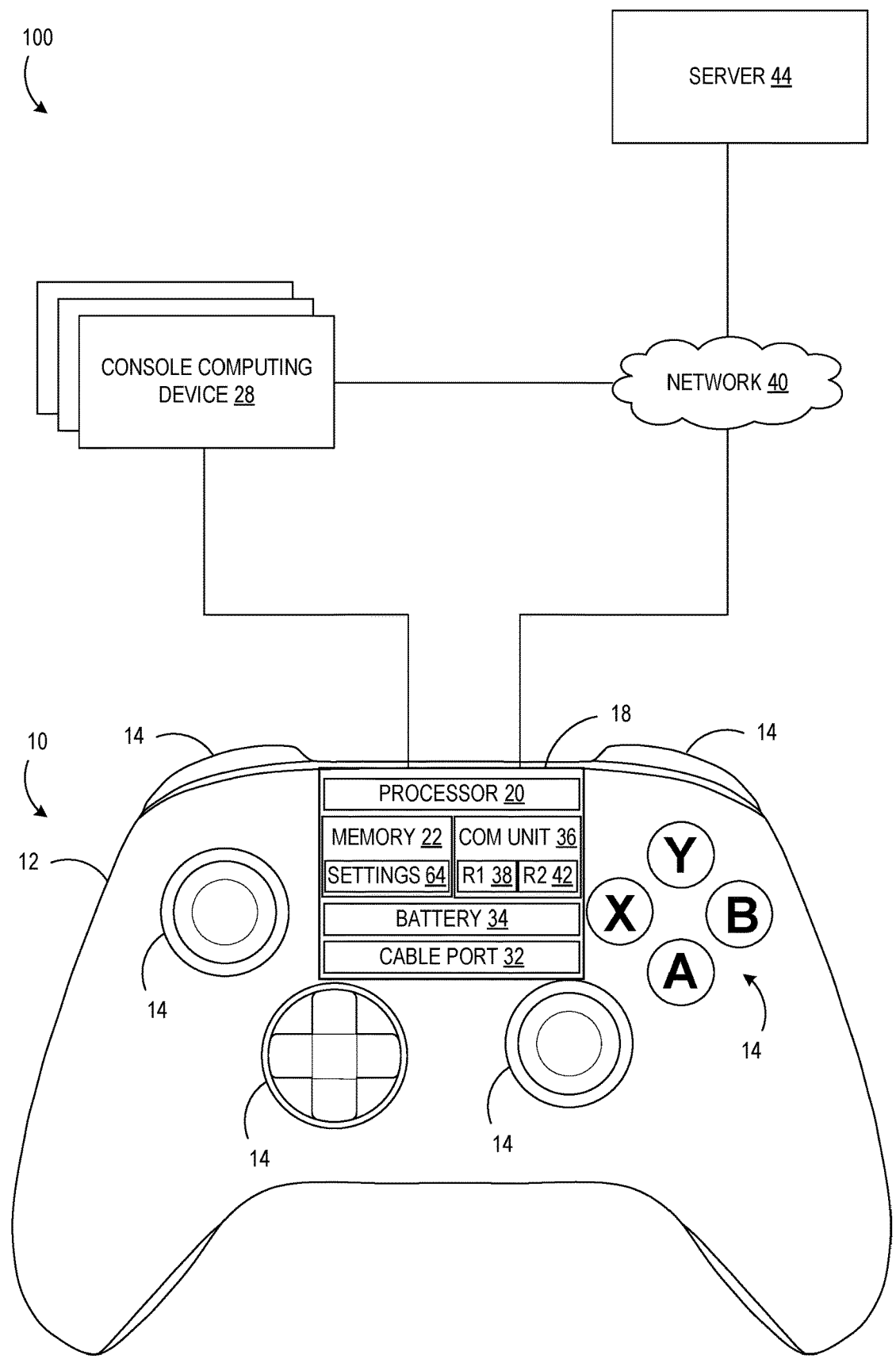
FIG. 1 shows a schematic view of a computing system including a console computing device and a controller system in accordance with the present disclosure.

To address the issues discussed above, FIG. 1 illustrates a computing system 100 including a controller system 10. The controller system 10 may include a controller base 12 including at least one input device 14 for receiving user input and a mechanical interface 16 (see FIG. 2A). The controller base 12 may be the portion of the controller system 10 that is shaped to be gripped by a user. In some examples, the controller base 12 is entirely mechanical without electrical functioning on its own, and in other cases, the controller base 12 includes wiring, a chip, etc. The controller base 12 may include any variety of input devices 14 such as buttons, keys, joysticks, directional pads, triggers, etc.

Figure 2A:
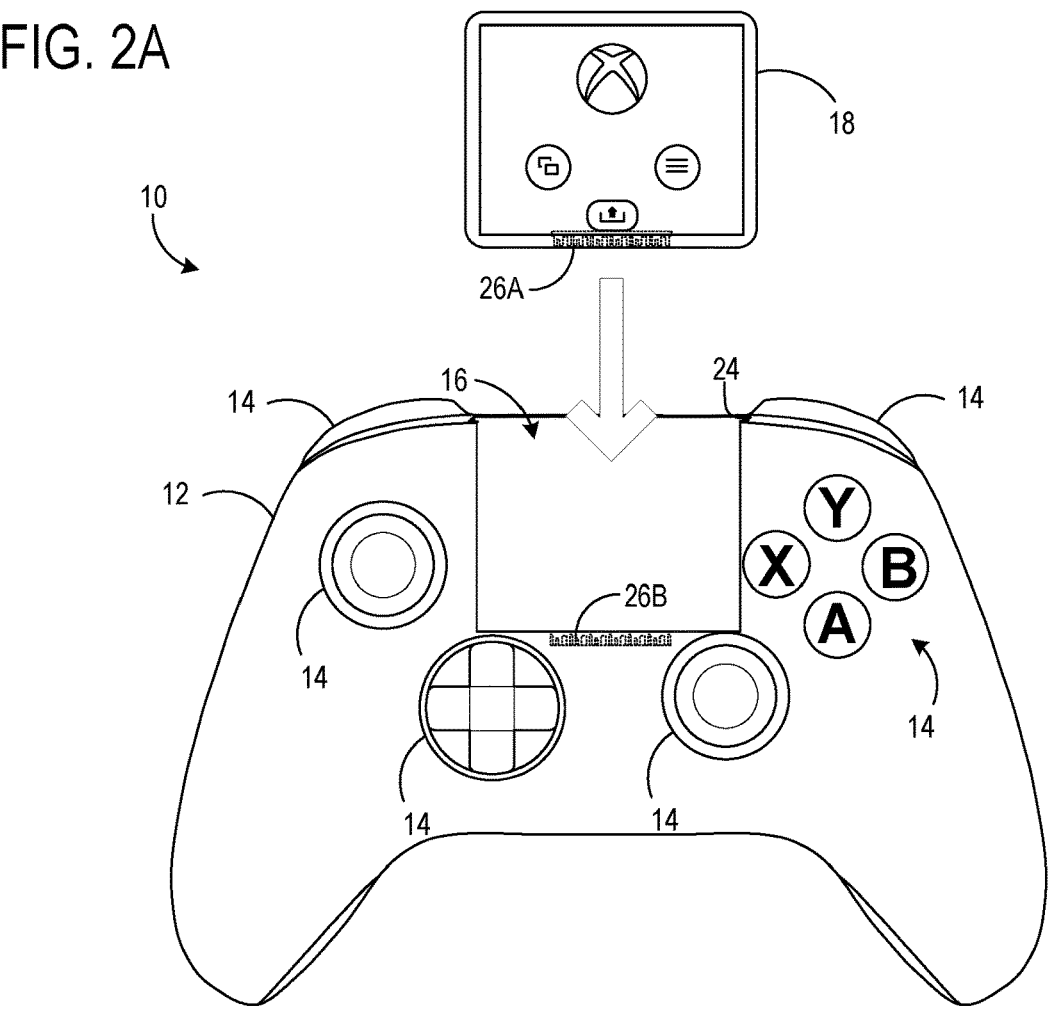
FIG. 2A shows an unassembled state of the controller system of FIG. 1.
Figure 2B:
FIG. 2B shows an assembled state.

The controller system 10 may include a controller module 18 comprising a processor 20 and memory 22. The components of the controller module 18 may be configured as a System-On-Chip, or may be separate components. The controller module 18 may be the "brain" of the controller system 10. It will be appreciated that the controller module 18 may be provided in any suitable form factor. As shown in FIGS. 2A-2B, the controller module 18 may be configured to removably mount on the controller base 12 at the mechanical interface 16 thereby establishing a communication link therebetween. In some implementations, the mechanical interface 16 includes a wired connection for the communication link. In others, the communication link may be wireless. Here, the mechanical interface 16 is illustrated as a recess configured to accommodate the controller module 18 when mounted. The mechanical interface 16 may have guides 24 on either side such that the controller module 18 may be slid into place to form the wired connection from connector 26A in the controller module 18 and connector 26B in the controller base 12. Rather than slide in, in one implementation, the controller module 18 may be configured to snap into place in the recess. The recess may conceal the controller module 18 like a cartridge, or, as illustrated, may incorporate a surface of the controller module 18 as part of a whole controller with the controller base 12.

Figure 3B:
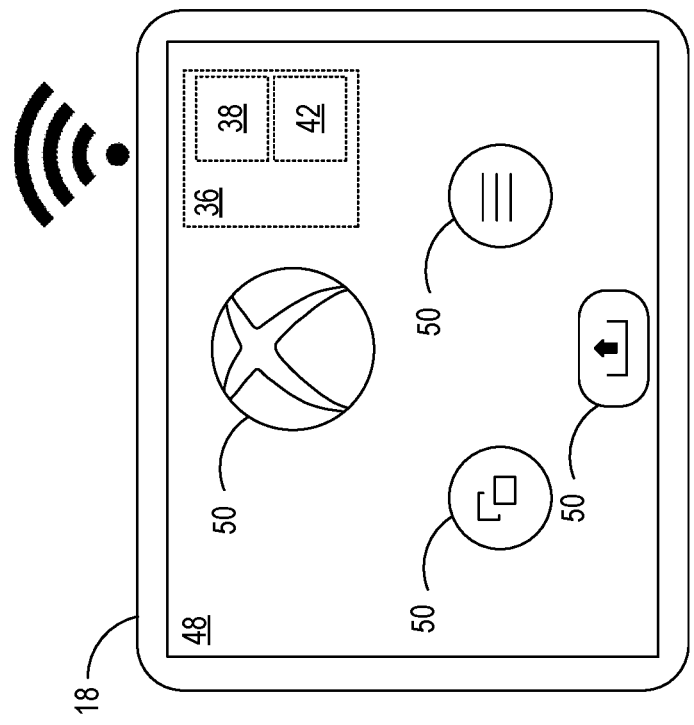
FIGS. 3A and 3B show two implementations of a controller module of the controller system of FIG. 1.
Figure 3A:
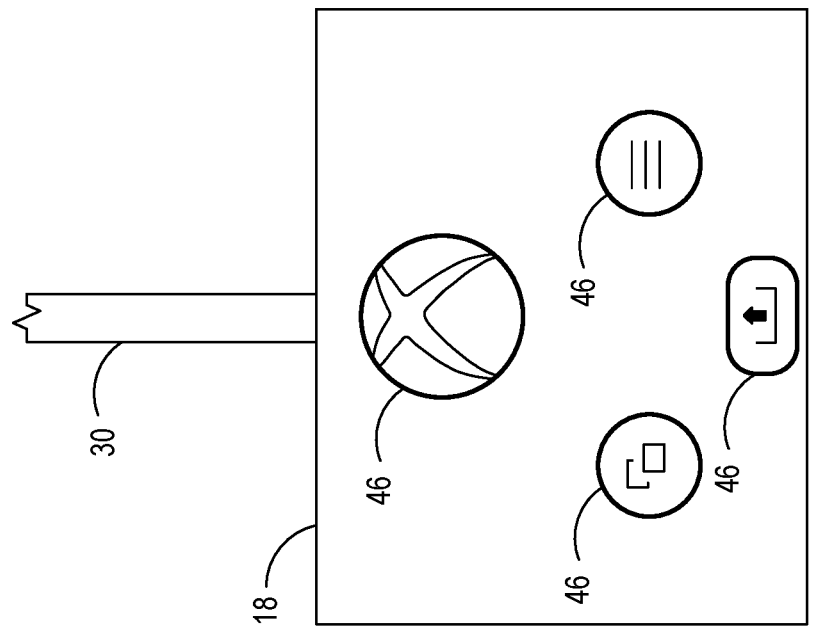

Once the communication link is established, the user input received at the at least one input device 14 may be routed through the controller module 18 to a console computing device 28. As shown in FIG. 3A, the controller system 10 may further comprise a cable 30 connected to the controller module 18 that is configured to connect to the console computing device 28. Returning to FIG. 1, the cable 30 may be connectable to the controller module 18 via a Universal Serial Bus (USB) connector at a cable port 32, for example, or may be hardwired. The controller module 18 may further comprise a rechargeable or replaceable battery 34, which may be rechargeable over the cable 30. In some cases, the battery 34 may be rechargeable via the wired connection to the controller base 12, or via an inductive charging pad. Additionally or alternatively to the cable 30, the controller module 18 may further comprise a communication unit 36 including at least one radio for wireless communication. For example, the communication unit 36 may include a first radio 38 which is an 802.11ax radio for wireless internet access via a network 40, and/or a second radio 42, which is a BLUETOOTH radio for short range direct wireless communication. controller system 10 may thus be configured to connect to any number of console computing devices, or to a server 44 such as a gaming server. Other types of radios may be included.

Figure 4A:
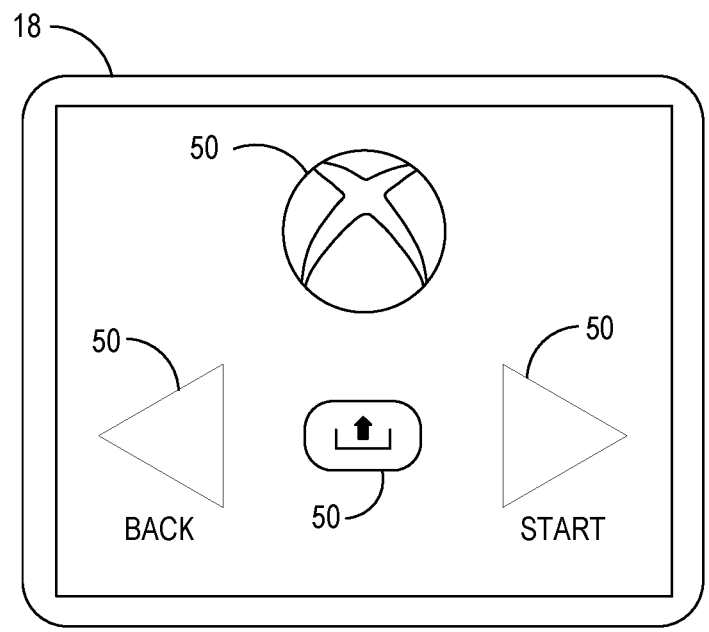
FIGS. 4A and 4B show examples of customizable buttons on touch screens of the controller module of FIG. 3B.
Figure 4B:
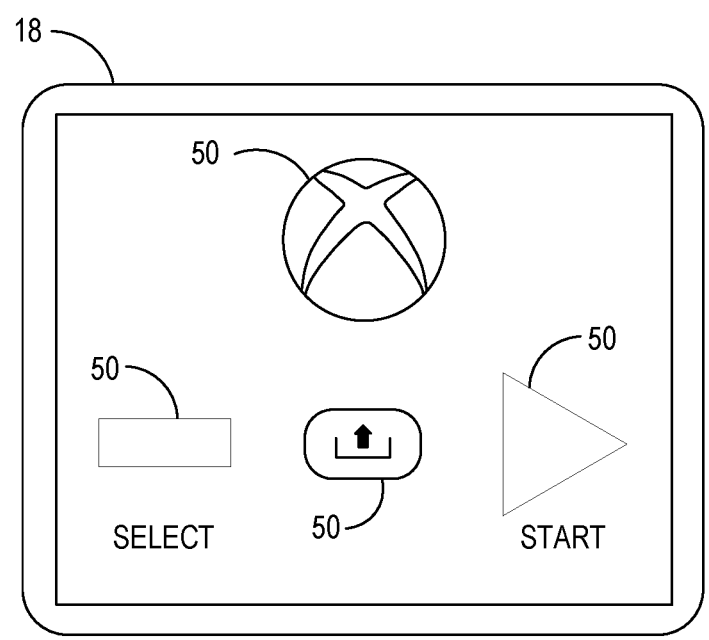
Figure 5A:
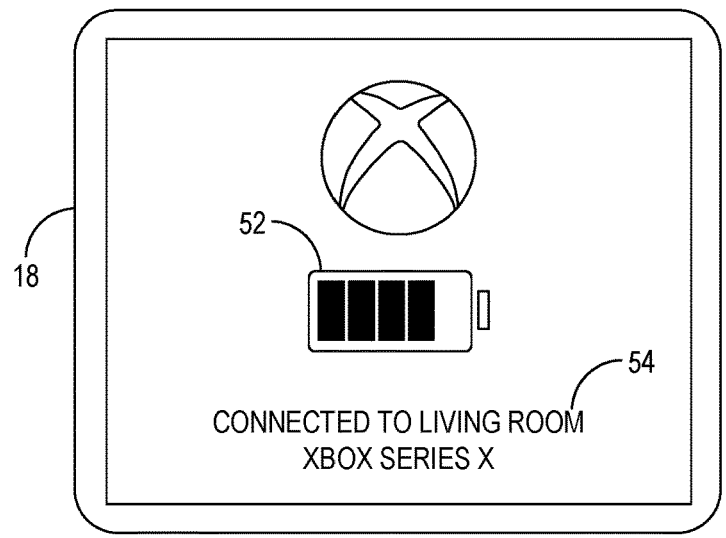
FIGS. 5A-5C show examples of graphical user interfaces displayed by the controller module of FIG. 3B.
Figure 5B:
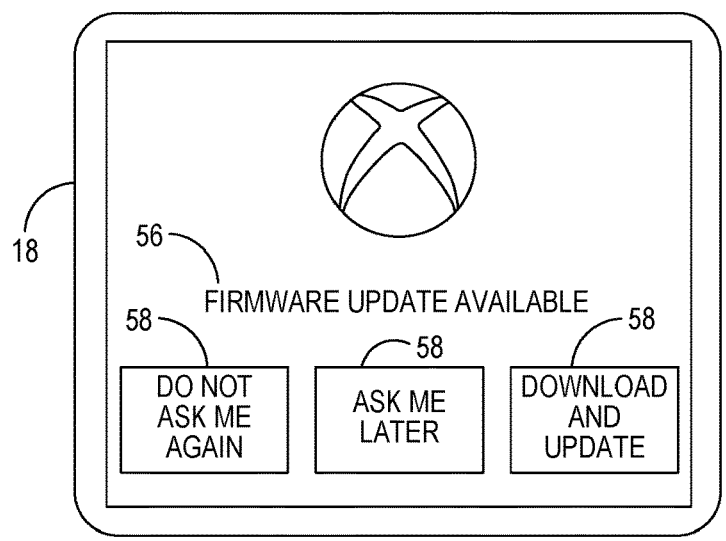
Figure 5C:
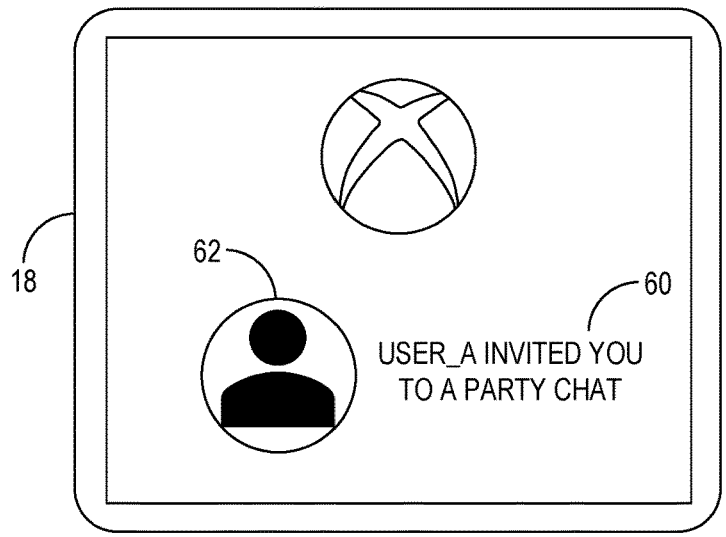

As illustrated in the example of FIG. 3A, the controller module 18 may include physical buttons 46 for receiving user input. Additionally or alternatively, as illustrated in FIG. 3B, the controller module 18 may include a touch screen 48 configured to display digital icons 50 for receiving user input. The touch screen 48 may be resistive, capacitive, or any other suitable type. As illustrated in FIGS. 4A-4B, the icons 50 may be customizable. Both the digital icons 50 and the physical buttons 46 as well as other types of input devices 14 may be configurable by the user to set custom input mappings. Beyond these digital icons, the controller module 18 may be configured to display many different types of information for the user and provide a variety of functions. For example, FIG. 5A illustrates a screen indicating a battery level 52 of the controller module 18 and a connection status 54. FIG. 5B illustrates a screen informing the user that a firmware update is available with a message 56, and provides options 58 for response by the user. Finally, FIG. 5C illustrates a screen displaying a chat request 60 and user icon 62. Thus, the user may be able to utilize extra functions that are not displayed on a main display screen (not illustrated) associated with the console computing device 28, or important information may be duplicated on the console computing device 28 and the main display screen. Additionally, the touch screen 48 may be configured to display information or options from a gaming program being played, such as a low health warning or an option to take a suggested action. The touch screen 48 may be used to help a user in need of assistance (e.g., someone new to the game, a casual gamer, or a person with disabilities) with prompts and icons depicting what a given button will do, such as a jumping figure for the "jump" button. One or more input device 14 such as buttons on the controller base 12 may be at least partially transparent so that the touch screen 48 may be visible underneath the input device 14. In some cases, the controller module 18 may be usable without the controller base 12, such as when connecting to a network or device, updating firmware, or chatting with another user. The controller module 18 may be operable solo offline, over a wireless network, or via a cellular connection enabled by the communication unit 36. The controller module 18 may include a global positioning system (GPS) receiver and be configured to implement a geolocated game for the user.

In some implementations, the controller module 18 may be further configured to store user settings 64 (see FIG. 1) in the memory 22. The user settings 64 may include user account information, game settings, and/or customized user input mapping, to provide merely a few examples. In some implementations, the user account information may be used to speed up security authentication and verification for the user, which may proceed with simple input such as a thumbprint or short PIN once the user has already been associated with the controller module 18. The user settings 64 may also be stored in memory of the console computing device 28 and/or server 44 and may be synched when altered and downloaded to a new controller module 18 when the user logs in. In this way, the user can seamlessly transfer settings from one controller to another by using the same controller module 18. For example, the controller base 12 may be a first controller base, and the controller module 18 may be configured to be removed from the first controller base and mounted on a second controller base, such as controller base 112 shown in FIGS. 6A-6B. It will be appreciated that the controller bases may be the same or different types.

The second controller base (in this example, the controller base 112) may be separated into two parts 112A, 112B each having a respective recess 66A, 66B for mounting the controller module 18 between the two parts 112A, 112B. The recesses 66A, 66B may form a slot such that each part 112A, 112B can envelop one edge of the controller module 18. Rather than communicating with the controller module 18 via a wired connection as in FIG. 2A, in the example shown in FIG. 6A, the controller base 112 includes at least one conductive contact 68 corresponding to the at least one input device 14, exposed within the recesses 66A, 66B. The conductive contacts 68 may be configured to relay the user input to the controller module 18 via the touch screen 48. The conductive contacts 68 may be any suitable type to be registered as a touch contact by the type of touch screen 48 used in the controller module 18. Although the controller base 112 may include a connector such as the connector 26B for interfacing with the controller module 18, alternatively, the controller module 18 may be configured to recognize that it is mounted between the two parts 112A, 112B of the controller base 112 based on a pattern of contacts 68 touching the touch screen 48, for example.

As discussed above, one controller module 18 may be used with different controller bases. Conversely, the controller module 18 may be configured to be removed from the controller base 12, such as in a reverse procedure from FIGS. 2A-2B, and the controller base 12 may be configured to receive a second controller module 18 storing user settings 64 of a different user mounted thereon. In this way, a user can bring just their own controller module 18 to a friend's house to be inserted into the friend's spare controller base 12, for example, and play together on the friend's console computing device. Thus, multiple users can use the same controller base 12 at different times without having to use someone else's settings or take the time to set their own settings again.

Figure 7:
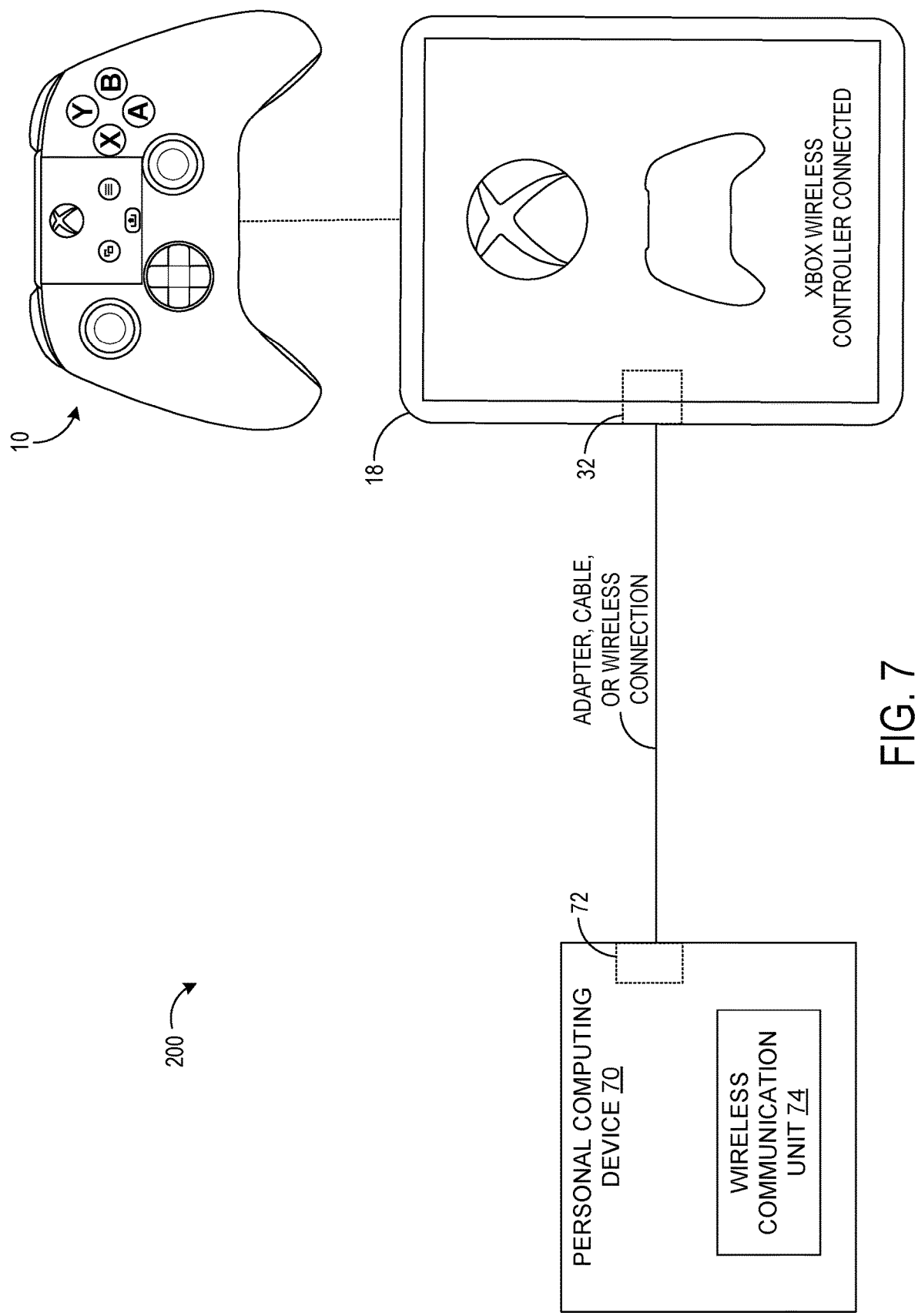
FIG. 7 shows a schematic view of a computing system including the controller system of FIG. 1 connected to a personal computing device.

Due to the one or more radios 38, 42 in the communication unit 36, the controller module 18 may have the ability to connect to a variety of different console computing devices 28, such as older legacy devices and newer devices developed after the controller module 18. In addition, as shown in a computing system 200 in FIG. 7, the controller module 18 may be further configured to connect to a non-console computing device such as a personal computing device 70, laptop, tablet, etc. The controller module 18 may interact directly with the personal computing device 70 by an adapter or cable connecting cable port 32 of the controller module and a port 72 of the personal computing device 70, or wirelessly using a wireless communication unit 74 of the personal computing device 70. When the controller module 18 is physically connected to the personal computing device 70, such as by a USB connection, the controller module 18 may quickly and automatically establish the connection and provide a familiar, user friendly graphical interface on the touch screen 48 for the user to easily connect a separate controller system 10. Thus, by using one controller module 18 as a wireless dongle, connection of the controller system 10 to a non-console computing device can be facilitated via the same user-friendly process regardless of the brand or operating system of the non-console computing device.

Figure 8:
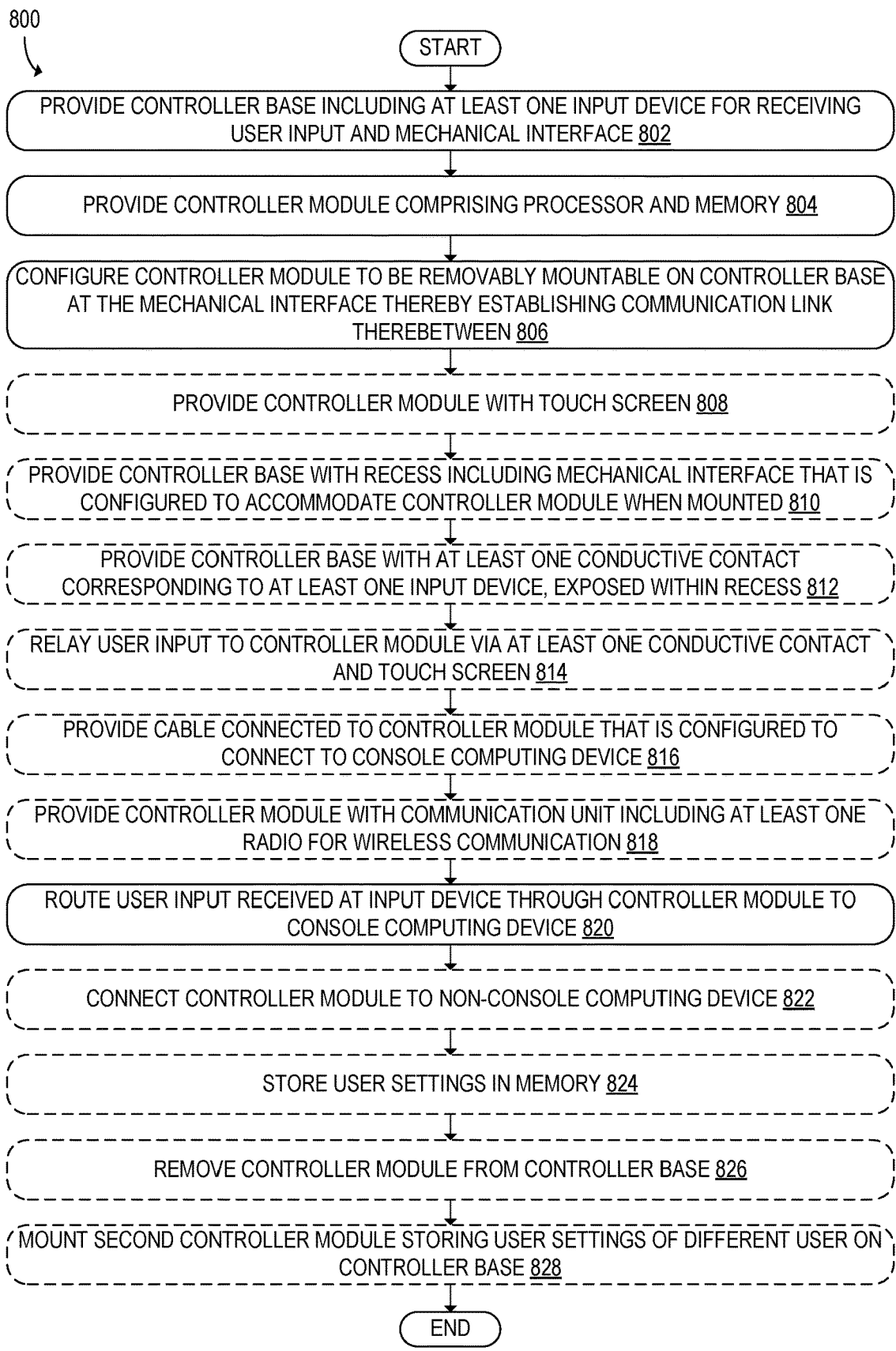
FIG. 8 is a flowchart of a method of providing a controller system.

FIG. 8 shows a flowchart of a method 800 of providing a controller system. The following description of method 800 is provided with reference to the controller systems described above and shown in FIGS. 1-7. It will be appreciated that method 800 may also be performed in other contexts using other suitable components.

At 802, the method 800 may include providing a controller base including at least one input device for receiving user input and a mechanical interface. The controller base may be in any suitable form and may be electronically wired or a non-electronic shell. At 804, the method 800 may include providing a controller module comprising a processor and memory. At 806, the method 800 may include configuring the controller module to be removably mountable on the controller base at the mechanical interface thereby establishing a communication link therebetween. The communication link may be wired or wireless, or through physical contact. At 808, the method 800 may include providing the controller module with a touch screen.

At 810, the method 800 may include providing the controller base with a recess including the mechanical interface that is configured to accommodate the controller module when mounted. The recess may be a single slot into which the controller module can be slid, such as in FIG. 2A, or the recess may be included in two separate parts of the controller base that can envelop two sides of the controller module, as in FIG. 6A, to provide merely a few examples. At 812, the method 800 may include providing the controller base with at least one conductive contact corresponding to the at least one input device, exposed within the recess. At 814, the method 800 may include relaying the user input to the controller module via the at least one conductive contact and the touch screen. In this manner, the controller base may be provided as a low-cost non-electronic shell which simply mechanically translates the motion of user input at the various input devices to the touch screen for interpretation by the controller module.

At 816, the method 800 may include providing a cable connected to the controller module that is configured to connect to a console computing device. Additionally or alternatively, at 818, the method 800 may include providing the controller module with a communication unit including at least one radio for wireless communication. Whether via wired or wireless communication, at 820, the method 800 may include routing the user input received at the at least one input device through the controller module to the console computing device. In this manner, the controller module may temporarily combine with the controller base to form a usable controller system for the user to interact with the console computing device, but retain the ability to be recombined in other ways according to the user's needs.

At 822, the method 800 may include connecting the controller module to a non-console computing device. The controller module may be connectable to a variety of computing devices such as personal computers, laptops, tablets, etc. in addition to console computing devices. At 824, the method 800 may include storing user settings in the memory. With the stored user settings, the controller module may be relocated to a different controller base and maintain the user's preferences, account details, etc. without requiring manual setup. In addition, at 826, the method 800 may include removing the controller module from the controller base, and at 828, the method 800 may include mounting a second controller module storing user settings of a different user on the controller base. Thus, storing the user settings may allow controller modules of different users to be swapped into the same controller base with immediate access to the current user's settings.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
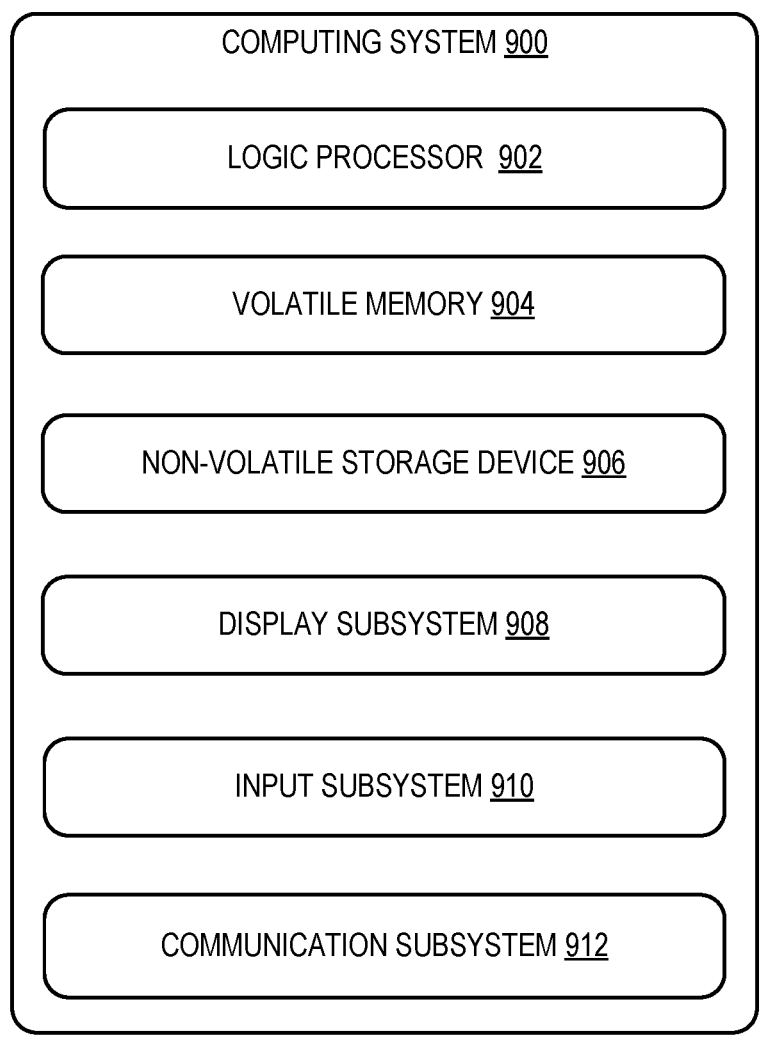
FIG. 9 is an example computing system according to an embodiment of the present description.

FIG. 9 schematically shows a non-limiting embodiment of a computing system 900 that can enact one or more of the methods and processes described above. Computing system 900 is shown in simplified form. Computing system 900 may embody the computing systems 100, 200 described above and illustrated in FIGS. 2 and 7. Computing system 900 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 typically implemented in software by a processor to perform a particular function using portions of volatile memory, which function involves transformative processing that specially configures the processor to perform the function. Thus, a program may be instantiated via logic processor 902 executing instructions held by non-volatile storage device 906, using portions of volatile memory 904. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a controller system comprising a controller base and a controller module. The controller base may include at least one input device for receiving user input and a mechanical interface. The controller module may comprise a processor and memory. The controller module may be configured to removably mount on the controller base at the mechanical interface thereby establishing a communication link therebetween. The user input received at the at least one input device may be routed through the controller module to a console computing device. In this aspect, additionally or alternatively, the mechanical interface may include a wired connection for the communication link. In this aspect, additionally or alternatively, the controller system may further comprise a cable connected to the controller module that is configured to connect to the console computing device. In this aspect, additionally or alternatively, the controller module may further comprise a communication unit including at least one radio for wireless communication. In this aspect, additionally or alternatively, the controller module may further comprise a battery. In this aspect, additionally or alternatively, the controller module may comprise a touch screen, and the controller base may further comprise a recess including the mechanical interface that is configured to accommodate the controller module when mounted and at least one conductive contact corresponding to the at least one input device, exposed within the recess and configured to relay the user input to the controller module via the touch screen. In this aspect, additionally or alternatively, the controller module may be further configured to connect to a non-console computing device. In this aspect, additionally or alternatively, the controller module may be further configured to store user settings in the memory. In this aspect, additionally or alternatively, the controller module may be configured to be removed from the controller base, and the controller base may be configured to receive a second controller module storing user settings of a different user mounted thereon. In this aspect, additionally or alternatively, the user settings may include user account information, game settings, and/or customized user input mapping.

Another aspect provides a method of providing a controller system. The method may comprise providing a controller base including at least one input device for receiving user input and a mechanical interface, providing a controller module comprising a processor and memory, configuring the controller module to be removably mountable on the controller base at the mechanical interface thereby establishing a communication link therebetween, and routing the user input received at the at least one input device through the controller module to a console computing device. In this aspect, additionally or alternatively, the mechanical interface may include a wired connection for the communication link. In this aspect, additionally or alternatively, the method may further include providing a cable connected to the controller module that is configured to connect to the console computing device. In this aspect, additionally or alternatively, the method may further include providing the controller module with a communication unit including at least one radio for wireless communication. In this aspect, additionally or alternatively, the method may further include providing the controller module with a touch screen, providing the controller base with a recess including the mechanical interface that is configured to accommodate the controller module when mounted, providing the controller base with at least one conductive contact corresponding to the at least one input device, exposed within the recess, and relaying the user input to the controller module via the at least one conductive contact and the touch screen. In this aspect, additionally or alternatively, the method may further include connecting the controller module to a non-console computing device. In this aspect, additionally or alternatively, the method may further include storing user settings in the memory. In this aspect, additionally or alternatively, the method may further include removing the controller module from the controller base, and mounting a second controller module storing user settings of a different user on the controller base.

Another aspect provides a controller system comprising. The controller system may comprise a first controller base including at least one input device for receiving user input and a mechanical interface. The controller system may comprise a second controller base. The controller system may comprise a controller module comprising a processor and memory. The controller module may be configured to removably mount on the first controller base at the mechanical interface thereby establishing a communication link therebetween. The memory may be configured to store user settings. The user input received at the at least one input device may be routed through the controller module to a console computing device. The controller module may be configured to be removed from the first controller base and mounted on the second controller base. In this aspect, additionally or alternatively, the second controller base may be separated into two parts each having a respective recess for mounting the controller module between the two parts.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A controller system comprising:
 a controller base including at least one input device for receiving user input and a mechanical interface; and
 a controller module comprising a processor and memory, the controller module configured to removably mount on the controller base at the mechanical interface thereby establishing a communication link therebetween, wherein
 the user input received at the at least one input device is routed through the controller module to a console computing device, the console computing device being separate from the controller module, and
 the controller module is further configured to store user settings in the memory.

2. The controller system of claim 1, wherein the mechanical interface includes a wired connection for the communication link.

3. The controller system of claim 1, further comprising a cable connected to the controller module that is configured to connect to the console computing device.

4. The controller system of claim 1, wherein the controller module further comprises a communication unit including at least one radio for wireless communication.

5. The controller system of claim 1, wherein the controller module further comprises a battery.

6. The controller system of claim 1, wherein
the controller module comprises a touch screen, and
the controller base further comprises:
 a recess including the mechanical interface that is configured to accommodate the controller module when mounted; and
 at least one conductive contact corresponding to the at least one input device, exposed within the recess and configured to relay the user input to the controller module via physical contact between the at least one conductive contact and the touch screen.

7. The controller system of claim 1, wherein the controller module is further configured to connect to a non-console computing device.

8. The controller system of claim 1, wherein the controller module is configured to be removed from the controller base, and the controller base is configured to receive a second controller module storing user settings of a different user mounted thereon.

9. The controller system of claim 8, wherein the user settings include user account information, game settings, and/or customized user input mapping.

10. The controller system of claim 1, wherein the controller base further includes a recess into which the controller module is inserted in order to removably mount on the controller base.

11. The controller system of claim 10, wherein the mechanical interface includes guides on either side of the recess configured to allow the controller module to be slid into place inside the recess.

12. A method of providing a controller system, the method comprising:
 providing a controller base including at least one input device for receiving user input and a mechanical interface;
 providing a controller module comprising a processor and memory;
 configuring the controller module to be removably mountable on the controller base at the mechanical interface thereby establishing a communication link therebetween;
 routing the user input received at the at least one input device through the controller module to a console computing device, the console computing device being separate from the controller module; and
 storing user settings in the memory.

13. The method of claim 12, wherein the mechanical interface includes a wired connection for the communication link.

14. The method of claim 12, further comprising providing a cable connected to the controller module that is configured to connect to the console computing device.

15. The method of claim 12, further comprising providing the controller module with a communication unit including at least one radio for wireless communication.

16. The method of claim 12, further comprising:
providing the controller module with a touch screen;
providing the controller base with a recess including the mechanical interface that is configured to accommodate the controller module when mounted;
providing the controller base with at least one conductive contact corresponding to the at least one input device, exposed within the recess; and
relaying the user input to the controller module via physical contact between the at least one conductive contact and the touch screen.

17. The method of claim 12, further comprising connecting the controller module to a non-console computing device.

18. The method of claim 12, further comprising:
removing the controller module from the controller base; and
mounting a second controller module storing user settings of a different user on the controller base.

19. A controller system comprising:
a first controller base including at least one input device for receiving user input and a mechanical interface;
a second controller base; and
a controller module comprising a processor and memory, the controller module configured to removably mount on the first controller base at the mechanical interface thereby establishing a communication link therebetween, the memory configured to store user settings, wherein
the user input received at the at least one input device is routed through the controller module to a console computing device, the console computing device being separate from the controller module, and
the controller module is configured to be removed from the first controller base and mounted on the second controller base.

20. The controller system of claim 19, wherein the second controller base is separated into two parts each having a respective recess for mounting the controller module between the two parts.

\* \* \* \* \*